United States Patent [19]

Fremstedal et al.

[11] 4,063,296
[45] Dec. 13, 1977

[54] METHOD AND MEANS FOR ERASING RECORDINGS ON MAGNETIC PAPER, PARTICULARLY FOR DISTANCE MEASURING EQUIPMENT

[75] Inventors: Sverre Oddmund Fremstedal; Otto Björn Lier, both of Horten, Norway

[73] Assignee: Simrad A.S., Horten, Norway

[21] Appl. No.: 593,924

[22] Filed: July 8, 1975

[30] Foreign Application Priority Data

July 8, 1974 Norway .............................. 742474
July 8, 1974 Norway .............................. 742475
July 8, 1974 Norway .............................. 742476

[51] Int. Cl.² ...................... G11B 5/47; G11B 5/48; G11B 5/02
[52] U.S. Cl. ................................ 360/118; 360/66; 360/81; 360/107
[58] Field of Search ............ 360/118, 107, 75, 82–83, 360/101, 66, 70, 130; 346/21

[56] References Cited

U.S. PATENT DOCUMENTS

| | | | |
|---|---|---|---|
| 2,657,062 | 10/1953 | Meunier | 360/81 |
| 3,176,083 | 3/1965 | Hauser | 360/107 |
| 3,351,717 | 11/1967 | Metz | 360/66 |
| 3,471,654 | 10/1969 | Dollenmayer | 360/101 |
| 3,559,999 | 2/1971 | Perkins | 360/118 |
| 3,578,337 | 5/1971 | Klein | 360/107 |
| 3,699,587 | 10/1972 | Currie | 346/21 |
| 3,818,500 | 6/1974 | Lemelson | 360/107 |
| 3,843,963 | 10/1974 | Kozu | 360/12 |
| 3,879,754 | 4/1975 | Ballinger | 360/118 |

FOREIGN PATENT DOCUMENTS

| | | | |
|---|---|---|---|
| 1,306,981 | 2/1973 | United Kingdom | 360/130 |
| 1,343,752 | 1/1974 | United Kingdom | 360/130 |

*Primary Examiner*—Alfred H. Eddleman
*Attorney, Agent, or Firm*—Watson, Cole, Grindle & Watson

[57] ABSTRACT

A magnetic recording medium is erased by mounting at least one magnet with its north-south poles parallel to the surface of the recording medium and transporting the recording medium in a plane horizontal to the north-south pole axis such that the magnetic field lines traverse the recording medium. The magnet may be mounted on an endless belt which moves substantially transverse to the direction of movement of the recording medium. The belt may be oscillated or moved continuously along its transverse path.

In an alternative embodiment, magnets may be mounted on the end of an arm which is adapted to be rotated in parallel spaced relation to the surface of the recording medium. Also, a number of permanent magnets may be mounted in two rows in spaced relation to form an aperture therebetween for transport of the recording medium therethrough.

The erasing means may be incorporated in apparatus for recording on the magnetic recording medium in which the endless belt supporting the magnet includes apertures therein which enable contact elements associated with the magnet to contact a pair of conductors for energizing the magnet either with AC or DC current.

12 Claims, 18 Drawing Figures

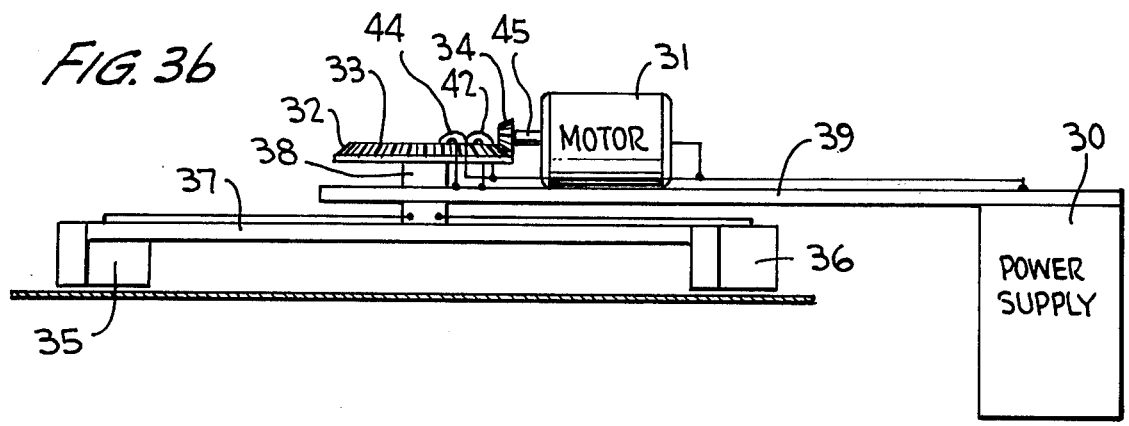
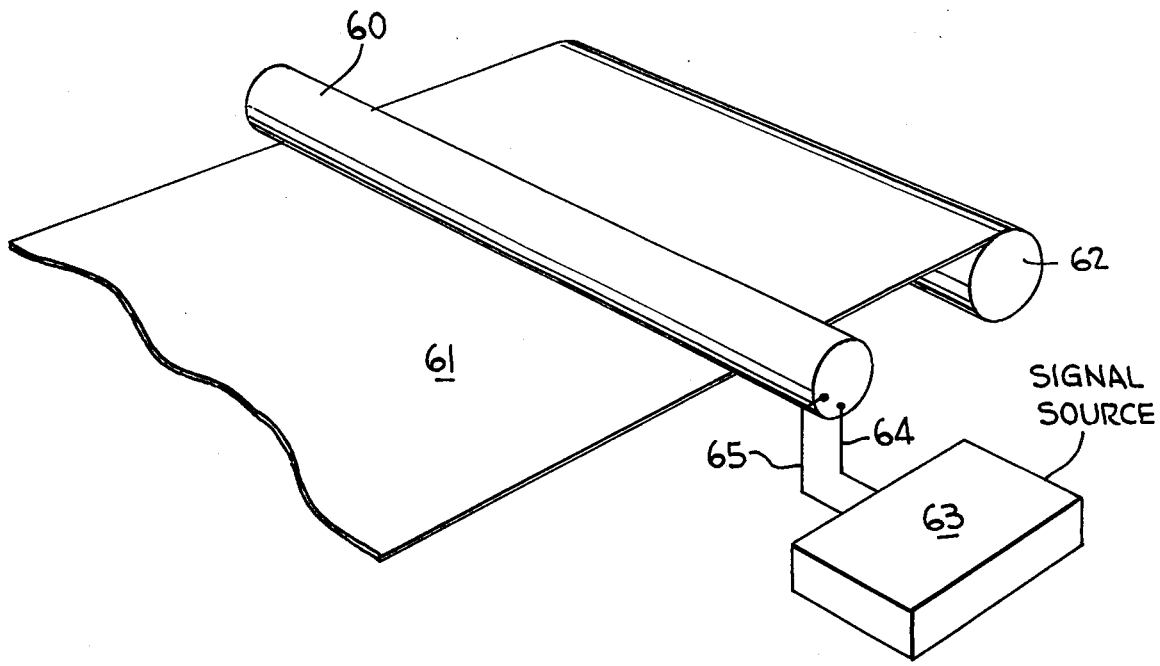
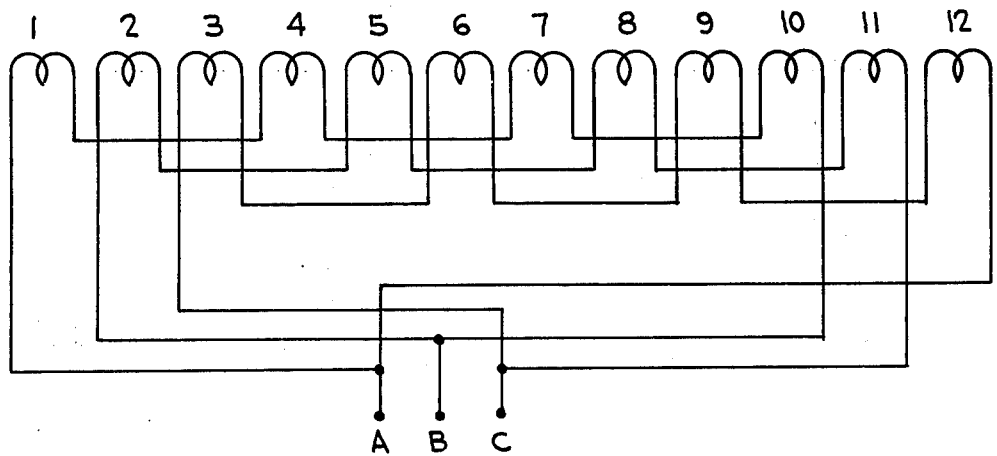

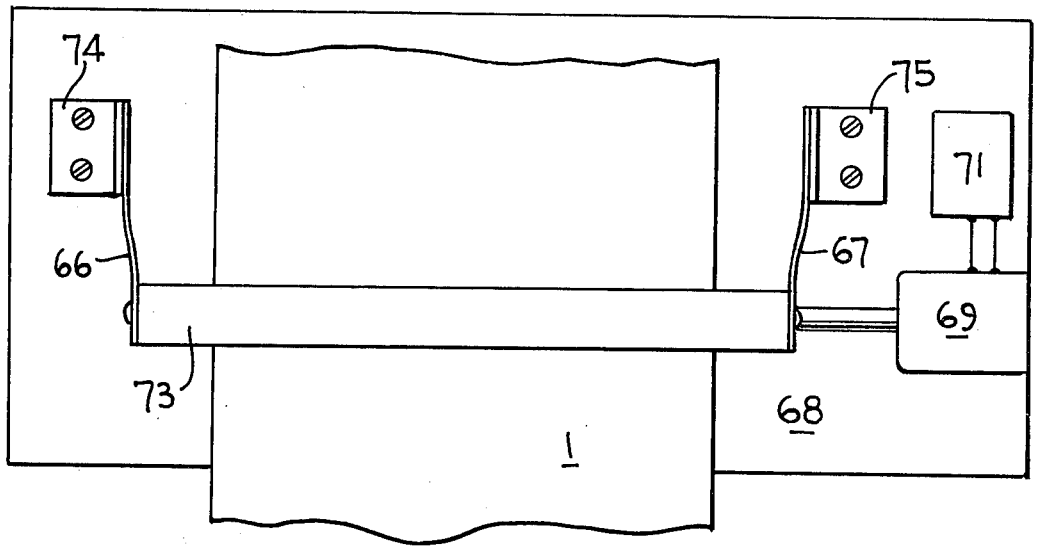
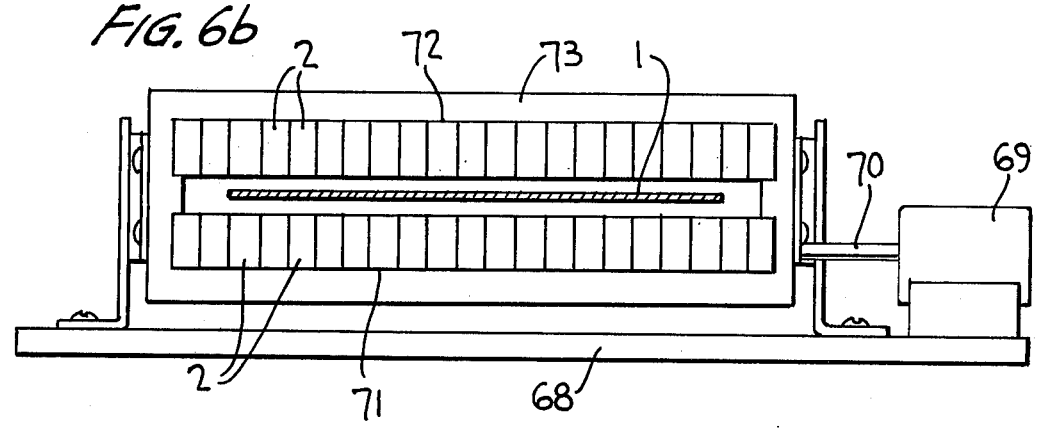
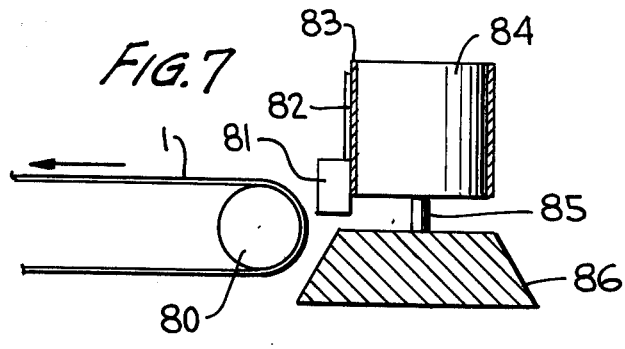
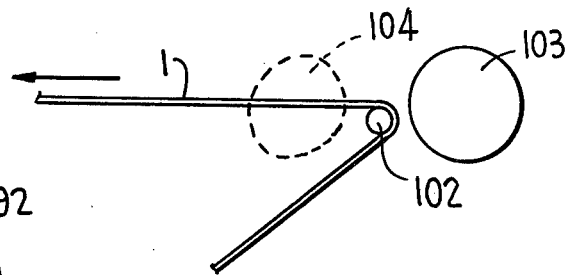
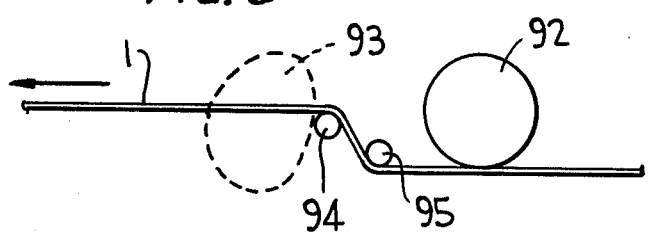

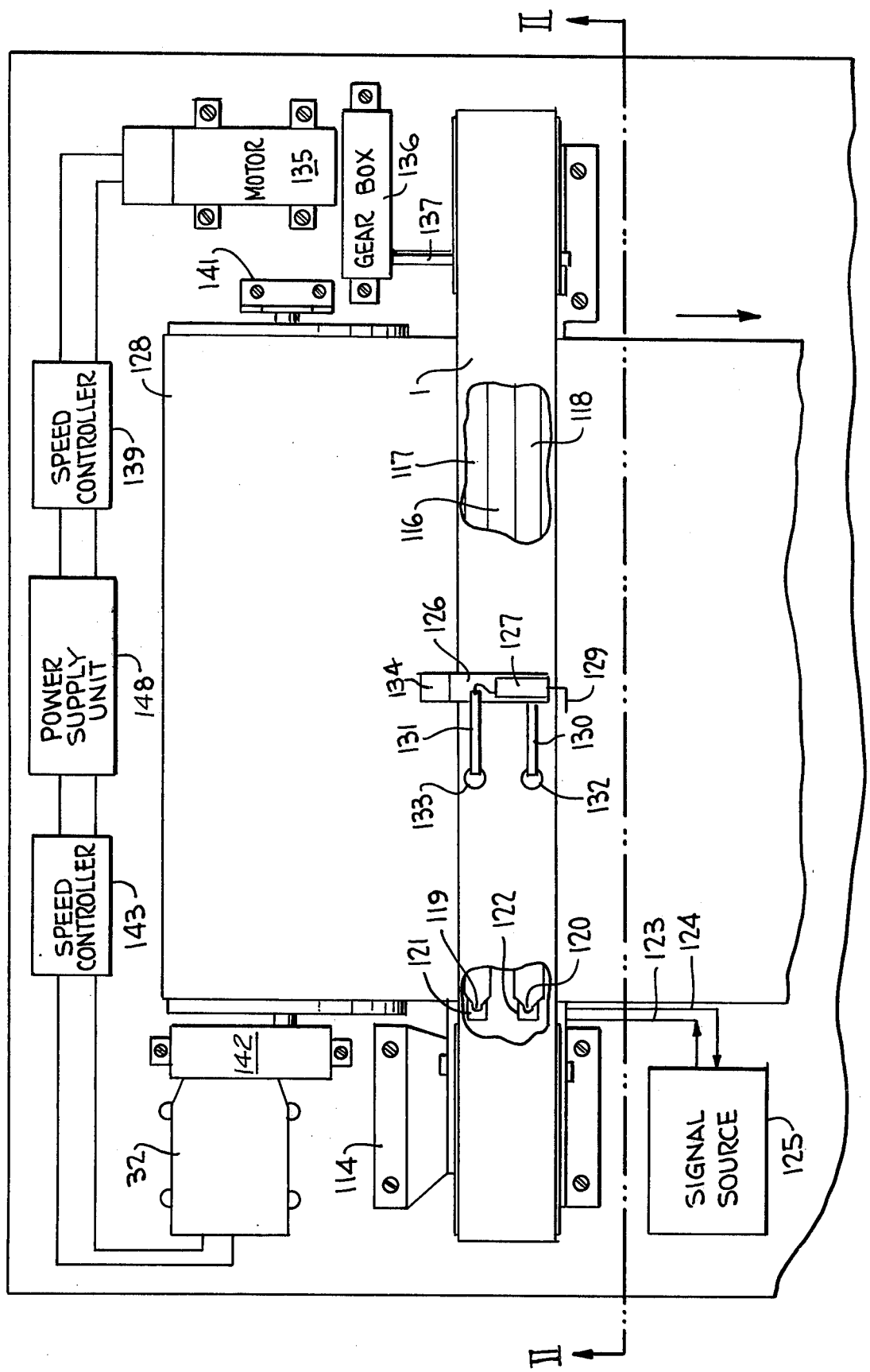

METHOD AND MEANS FOR ERASING RECORDINGS ON MAGNETIC PAPER, PARTICULARLY FOR DISTANCE MEASURING EQUIPMENT

BACKGROUND OF THE INVENTION

The present invention relates to methods and apparatus for erasing a recording on magnetic recording media for preparing the media for a new recording. An erasing means for such magnetic media has previously been described in Electronics, March 1, 1973, pages 73–76, and in U.S. Pat. No. 3,683,382. In both of the above references erasing means are disclosed wherein large electromagnets are used to prealign the reflecting elements in the recording medium. In both cases a combination of a constant and a varying electromagnetic field is used. It is stated that it is less efficient to use a permanent field only for prealigning the elements than the rotating vector field resulting from the combination of the varying and the permanent field. The varying magnetic field is created by connecting a solenoid to an AC source, and the constant field is created by connecting a corresponding solenoid to a DC source. The DC magnet may be replaced by a permanent magnet.

These known electromagnetic erasers are comparatively large and expensive, and the power consumption is too large for many potential applications.

According to the present invention there is provided both method and apparatus for erasing a record on a magnetic medium using a permanent magnetic field using one or more small magnets. One or more permanent magnets are used with a result that is not significantly inferior to erasing with a varying magnetic field created by the combination of an AC and DC electromagnet.

The present invention provides an erasing means which is both less expensive, smaller and which uses less power than the known erasing means.

BRIEF DESCRIPTION OF THE DRAWINGS

The following embodiments of the invention will be apparent from the following description with reference to the Figures, wherein:

FIG. 2b is a section along line b—b of FIG. 2a;

FIG. 3b is a sectional view of FIG. 3a;

FIG. 4 illustrates a fourth embodiment of the invention;

FIG. 5 shows the manner in which the coil of the electromagnet of FIG. 4 is wound;

FIG. 6a is a modification of the embodiment of FIG. 5;

FIG. 6b is a side sectional view of FIG. 6a;

FIGS. 7 to 9 illustrate preferred relationships between the moving recording medium and the electromagnet for creating the optimum erasing magnetic field;

FIGS. 10 and 11 show an application of the erasing structure of the invention in an echo sounding recording apparatus;

In FIG. 1a, a web of magnetic recording medium 1 is fed in the direction of the arrow by structure well known to those skilled in the art. It may, for instance, be wound off a supply roll and onto a take-up roll (not shown). Magnet 2 is mounted on endless belt 3 and travels across the medium 1 when belt 3 is moving. The distance between magnet 2 and medium 1 is preferably small. Magnet 2 is mounted with its north-south poles parallel to the direction of motion of belt 3 which runs around drive roller 4 and free roller 5. Free roller 5 is journalled in base 6. Drive roller 4 is mounted on an output shaft (not shown) of drive unit 7, which includes an electric motor, gearbox and an electronic control circuit.

Figure 1A:
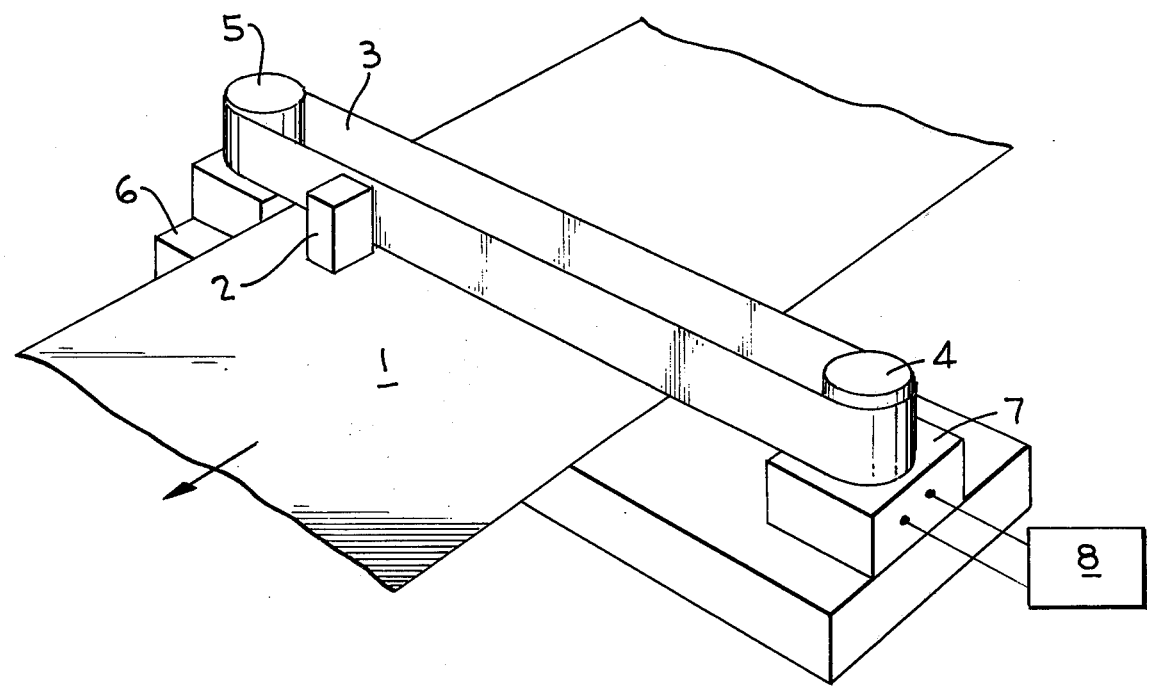
FIG. 1a shows an embodiment of a single permanent magnet mounted on a moving belt transverse to the movement of the recording medium.

To erase a recording from medium 1, magnet 2 is moved to and fro across the medium, while it is fed in the direction of the arrow. The speed of the reciprocating magnet 2 must be sufficiently high in relation to the feed velocity of the medium for the erasing effect to cover the whole surface of the medium.

Drive unit 7 rotates drive roller 4 alternately clockwise and anti-clockwise to move magnet 2 back and forth across medium 1. End stop sensors, e.g., reed relays (not shown), may be mounted on base 6. Once connected to the drive unit 7, the end stop sensors can control the change of direction of rotation of drive roller 4. As a result of the combined motion of medium 1 and magnet 2, magnet 2 describes a zig-zag pattern across medium 1, leaving recording medium 1 prealigned and ready for a new recording.

Belt 3 may also be moved around rollers 4 and 5 continuously in the same direction. Magnet 2 will then travel up the paper on one side of rollers 4 and 5 and down the other side. When magnet 2 travels around rollers 4 and 5, the point of attachment between magnet 2 and belt 3 is subject to a considerable load. Magnet 2 may therefore work loose and fall off, and in many cases it may be advantageous to change the direction of rotation of driver roller 5.

Figure 1B:
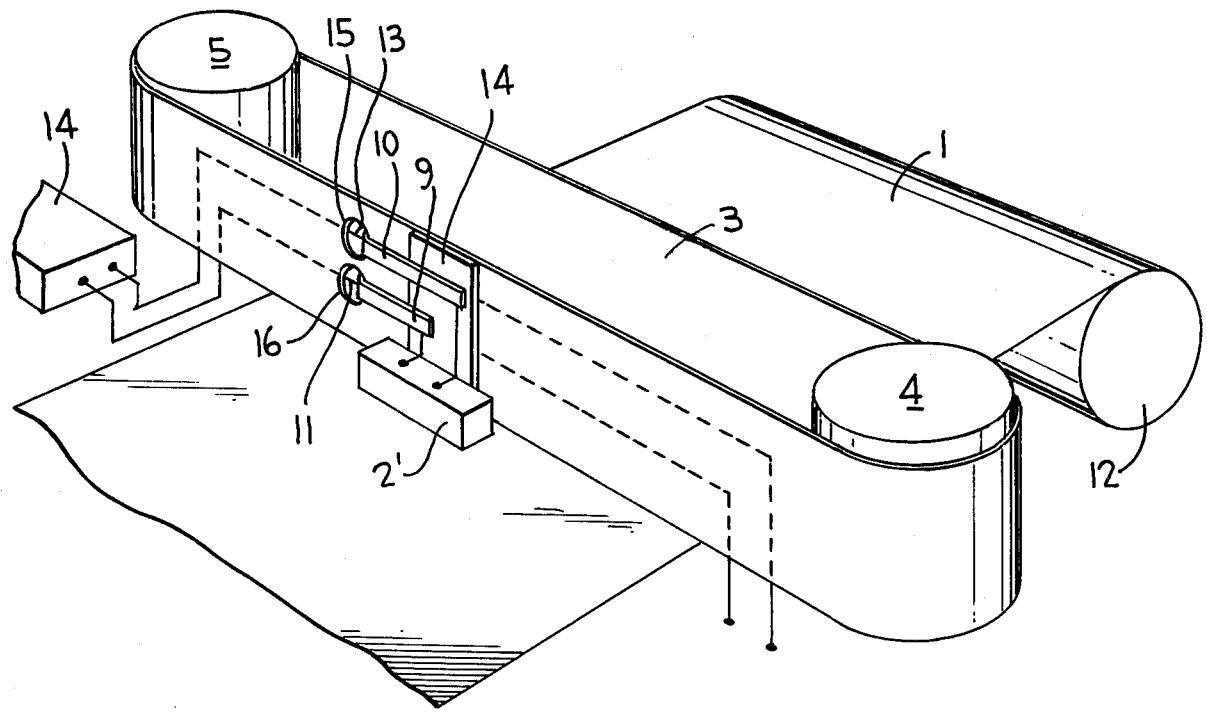
FIG. 1b shows a modification of the first embodiment using an electromagnet.

In FIG. 1b, like structure is identified by the same numeral designations as in FIG. 1a. Magnetic recording medium 1 is fed from supply roll 12. Two rollers 4 and 5 are mounted on each side of medium 1. Flexible, endless belt 3 runs rollers 4 and 5 and over recording medium 1. Clip 14 is fastened to belt 3 and carries electromagnet 2'. Electromagnet 2' is mounted to move just above medium 1 when belt 3 runs around rollers 4 and 5. Electromagnet 2' is electrically coupled to contact springs 9 and 10. Along part of the belt circuit; contact springs 9 and 10 make contact with wires 11 and 13, respectively, through holes 15 and 16 in belt 3. Erasing signal generator 14 is electrically connected to the wires 11 and 13 and energizes electromagnet 2'. Electromagnet 2' is preferably a coil with many windings around a soft iron core with its magnetic axis in the direction of motion of the belt. The signal from generator 14 may be a DC or AC signal. An AC signal gives better erasures, but the simpler solution is using a DC generator which may be a dry battery.

Belt 3 is driven by an electric motor (not shown) by means of one of rollers 4, 5 with the other roller free. The moving part may be journalled in any suitable way. When belt 3 moves, electromagnet 2' is moved across recording medium 1. When contact springs 9 and 10 make contact with the wires 11 and 13 an electric current flows through electromagnet 2', and a magnetic field is set up with the north-south direction in the direction of motion of electromagnet 2'.

The magnetic field has components both parallel to and at right angles to the surface of the recording medium. Electromagnet 2' is designed so that the magnetic field generally is parallel to the recording surface in the region where the field ceases to have visible influence. When electromagnet 2' is moved across medium 1, the magnetic elements in this border region will be aligned mainly parallel to the surface of the recording medium. As electromagnet 2' moves further from a given magnetic element the field strength is reduced to below the level necessary for turning the magnetic element and its poles remain parallel to the surface of the medium. A field parallel to the surface gives the best result, but acceptable erasure has been obtained using a field at an angle with the surface of more than 45°.

When the whole of the border region in this way is subjected to a diminishing magnetic field parallel to the surface of the recording medium, the whole of the border region is left erased. As the medium is fed forward, it moves from a stronger towards a weaker magnetic field parallel to the surface, and the whole of the medium is prealigned. For even prealignment the speed of belt 3 should be set in accordance with the feed rate of recording medium 1. A too low belt speed in relation to recording medium feed rate results in a blotchy erasure.

The design of electromagnet 2' is not critical, but it must, however, be sufficiently strong, and the distance between electromagnet 2' and medium 1 should be as small as possible. More than one electromagnet 2' may of course be used on belt 3. Erasing may also take place every time the magnet crosses recording medium 1 by fitting a second set of contact wires on the opposite side of the belt loop.

Figure 2A:
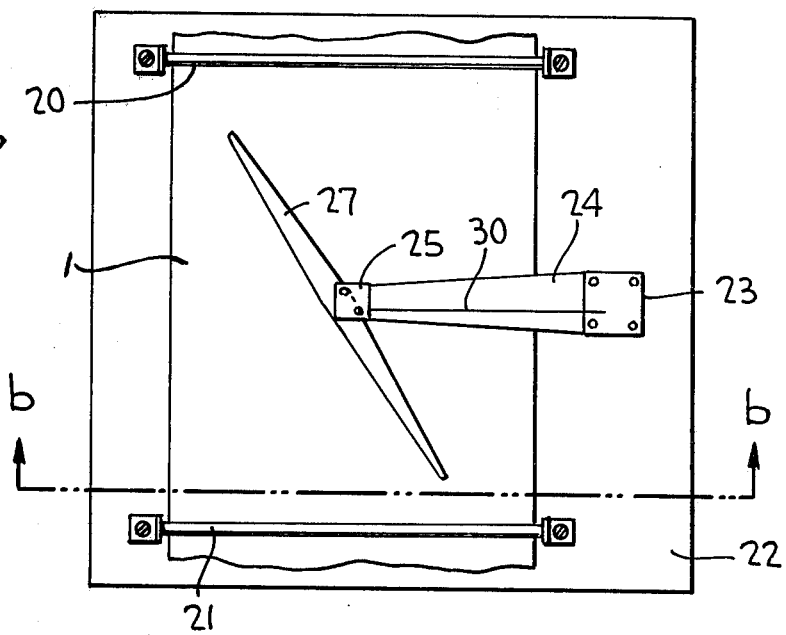
FIG. 2a is a second embodiment of the invention.
Figure 2B:
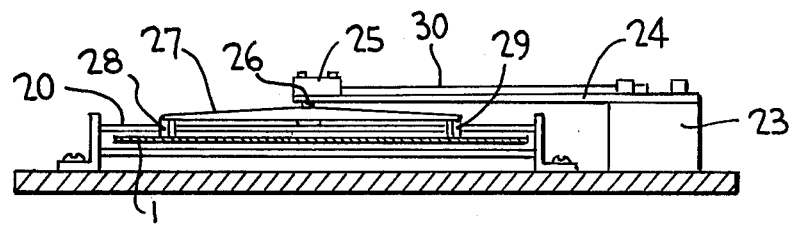

In FIGS. 2a and 2b, recording medium 1 is fed through two sets of rollers 20 and 21 mounted on a base 22. Power supply unit 23 is bolted to base 22 and supports cantilever 24, which extends in and over the middle of recording medium 1. Electric motor 25 is bolted to the end of cantilever 24. Output shaft 26 from motor 25 extends downwards and through cantilever 24 in the direction of medium 1. Magnet support arm 27 is fixed to output shaft 26 of motor 25, which consequently rotates magnet support arm 27. Two magnets 28 and 29 are bonded to magnet support arm 27, one at each end. The north-south direction of the magnets is in the direction of motion. The field strength of magnets 28 and 29 should be selected to suit the particular application. The field strength would depend on the distance between the medium and the magnet, the speed of the magnet across medium 1 and feed rate of the recording medium. Motor 25 is driven by power supply unit 23 through lead wire 30. When magnet support arm 27 rotates as medium 1 is fed through below the support arm, old recordings are erased, and the medium is prealigned to be ready for a new recording.

Figure 3A:
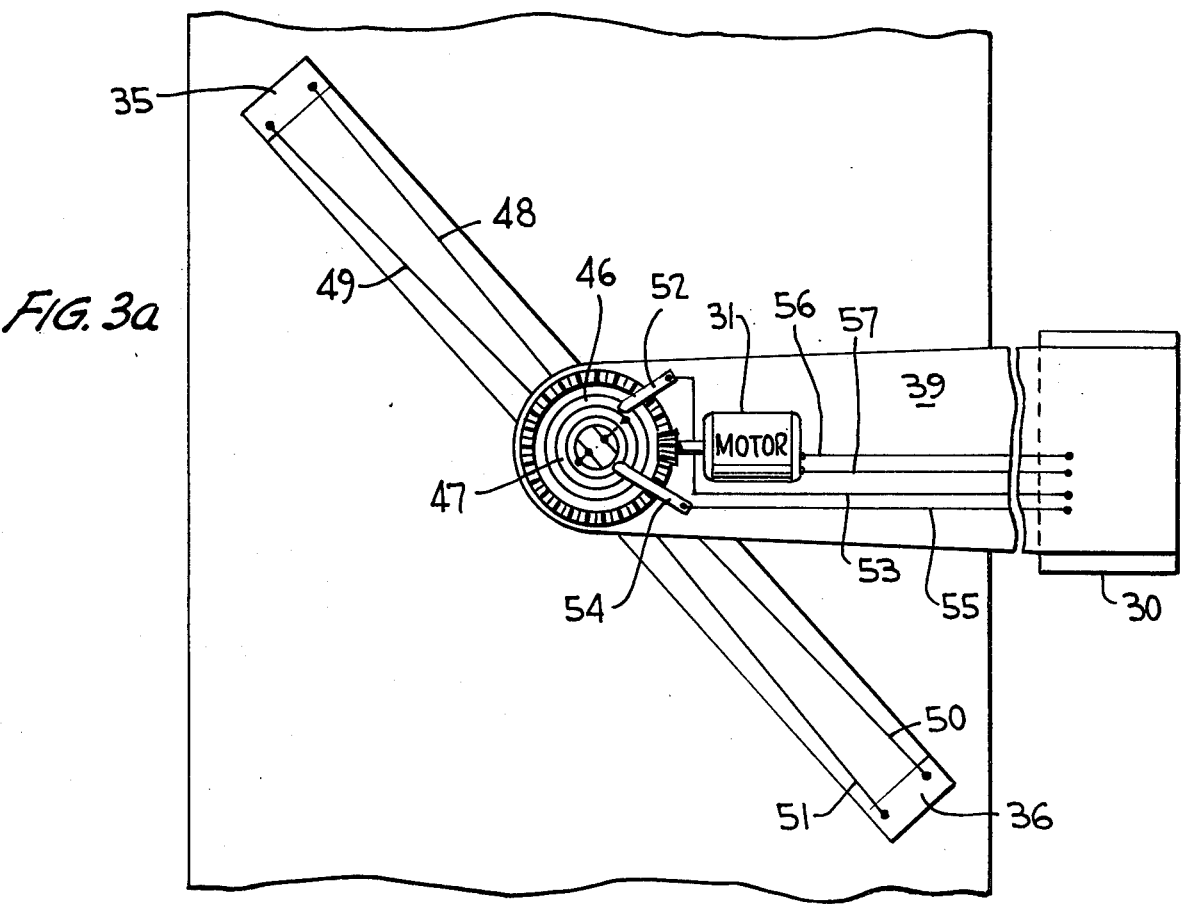
FIG. 3a is a third embodiment of the invention.

In FIGS. 3a and 3b, a third embodiment of the invention is shown. Two electromagnets 35 and 36 are mounted one at each end on magnet support arm 37. Magnet support arm 37 is carried by hollow shaft 38 journalled in cantilever 39, which is, in a suitable manner, affixed to power supply unit 30, which supplies power to electric motor 31 and to electromagnets 35 and 36. Annular disc 32 with a toothed rim 33 is mounted on shaft 38. Toothed rim 33 engages gear 34 on the output shaft 45 of the motor 31.

Two slip-rings 46 and 47 are attached to disc 32. Slip-rings 46 and 47 are, through leads 48 and 49, connected to each end of electromagnet 35. Electromagnet 36 is connected to slip-rings 46 and 47 through leads 50 and 51. Slip-ring 46 is connected to power supply unit 30 by contact spring 52 and a lead 53. Slip-ring 47 is connected to power supply unit 30 through contact spring 54 and lead 55. Motor 31 is connected to power supply unit 30 through leads 56 and 57.

A base for the eraser and rollers or other recording medium guide devices are not shown in the Figures, as it is considered well within the capabilities of a skilled person to produce these according to the requirements of the individual application.

Motor 31 rotates magnet support arm 37 by gear 34 and toothed rim 33. Electromagnets 36 and 37 move in a circle across and slightly outside medium 1 and erase old recordings at the same time as the magnetic elements in the recording medium are prealigned as previously described. Electromagnets 36 and 37 may be fed from a DC or AC source. Using AC, electromagnets 36 and 37 may be part of an oscillating circuit.

In FIG. 4 electromagnet 60 is positioned across a web of recording medium 61 to be prealigned before a new recording is made. Medium 61 is fed from roll 62. Electromagnet 60 is fed from signal source 63 through leads 64 and 65, signal source 63 preferably being an AC source.

When recording medium 61 is fed forwards away from magnet 60, it is moved from a stronger to a weaker magnetic field and leaves the active magnetic field in a region where the field lines are mainly parallel to the surface of medium 61.

FIG. 5 shows schematically how the coil of an electromagnet, as shown in FIG. 4, may be wound for use with a three-phase AC source. Wings No. 1, 4, 7 and 10 are connected in series between input terminals A and B. Windings No. 2, 5, 8 and 11 are connected in series between terminals B and C. Windings No. 3, 6, 9 and 12 are connected in series between terminals C and A. When the terminals A, B and C are connected to a three-phase generator (not shown) a traveling magnetic field moving along the coil from one end towards the other is produced.

Electromagnet 60 would normally include a larger number of windings than the 12 shown in FIG. 5. A signal source of more phases than three may also be used. Electromagnet 60 would then have more than three sets of windings. The windings are shown as being series connected. A connection in parallel or a combination of series and parallel connection may be chosen to suit the impedance requirements.

In the embodiment shown in FIGS. 6a and 6b, a large number of magnets 2 are bonded together forming two rows 61 and 62 of magnets. Magnets 2 are preferably mounted with like poles facing each other in rows 71 and 72, which are mounted in frame 73 providing a slot through which recording medium 1 is fed. Frame 73 is mounted on brackets 64 and 65 by springs 66 and 67. Brackets 74 and 75 are bolted to base 68.

Springs 66 and 67 allow frame 73 and rows 71 and 72 a limited freedom of motion across recording medium 1. In use, frame 73 is driven by solenoid 69 and piston 70, which is bonded to the side of frame 73. It displaces frame 73 from its equilibrium position defined by springs 66 and 67 when a current is sent through solenoid 69. Solenoid 69 is driven by current pulses from power supply unit 71. The pulse repetition frequency depends on the record medium's feed rate through the erasing means and is sufficiently high for the erasing action to be effective over the whole of recording medium 1. The stroke of piston 70 depends on the design of rows 71 and 72. It should, however, be sufficiently long to avoid blotches on recording medium 1. A single row of magnets reciprocating across the paper will for many applications yield a satisfactory result.

In FIG. 7, recording medium 1 runs around roller 80 in the direction of the arrow. Erasing magnet 81 is bonded to clip 82 on belt 83 similar to the arrangement shown in FIG. 1a. Belt 83 runs around roller 84 which is journalled on stud 85 which is mounted in base 86. The driver roller and motor may be of the same design as in FIG. 1a.

The top of roller 80 is approximately on the same level as the middle of magnet 81, which is affixed with the north-south pole direction parallel to roller 80. The distance between magnet 81 and roller 80 is sufficiently small for the magnetic field to control the direction of the magnetic elements of the recording medium in the region where it is moving directly away from magnet 81.

When being erased, recording medium 1 moves through a border region where the strength of the magnetic field diminishes from being able to control the direction of the magnetic elements in the recording medium to a region where the magnetic field has no effect.

In the example in FIG. 7, the field lines in the border region are parallel to the surface of recording medium 1. In that part of the border region where magnet 81 influences the direction of the magnetic elements, they are aligned parallel to the surface of the recording medium. As the recording medium is moved along, the magnetic elements move into a steadily weaker field which in the end does not affect them. During the whole of this process the magnetic elements have been in a field which is parallel to the surface of the recording medium, and their alignment has not been changed.

FIG. 8 shows how recording medium 1 may be guided past electromagnet 92 for the magnetic field in a border region 93 to be as parallel to the surface of the recording medium as possible. Using rollers 94 and 95, preferably unmagnetic, recording medium 1 is deflected so that it is moving radially away from the center of electromagnet 92 in the border region 93 as indicated by the arrow. Electromagnet 92 may be stationary, like the magnet 60 in FIG. 4, or moving as in FIGS. 1a and 2a. If the magnet follows a curved path, as in FIG. 2a, it may be difficult to make the recording medium move radially away from the path of magnet 92 along the whole of the region where erasing takes place. The main point is, however, that the recording medium is transported away from the magnet in such a way that an extension of the recording medium in the border region 93 goes through the center of electromagnet 92. Adjustments may, however, be necessary, as the field around magnet 92 may be modified considerably by adjacent magnetic material.

FIG. 9 shows another way of moving the recording medium radially away from the magnet. The magnetic recording medium is fed forward in the direction of the arrow. Recording medium 1 runs around roller 102 near electromagnet 103, and leaves roller 102 in a direction pointing away from the axes of electromagnet 103, whereby recording medium 1 in border region 104 lies in a plane going through the axes of electromagnet 103. When a movable electromagnet 103 is used the axis of the magnet travels in a plane coinciding with the plane of the recording medium border region 104.

Figure 11:
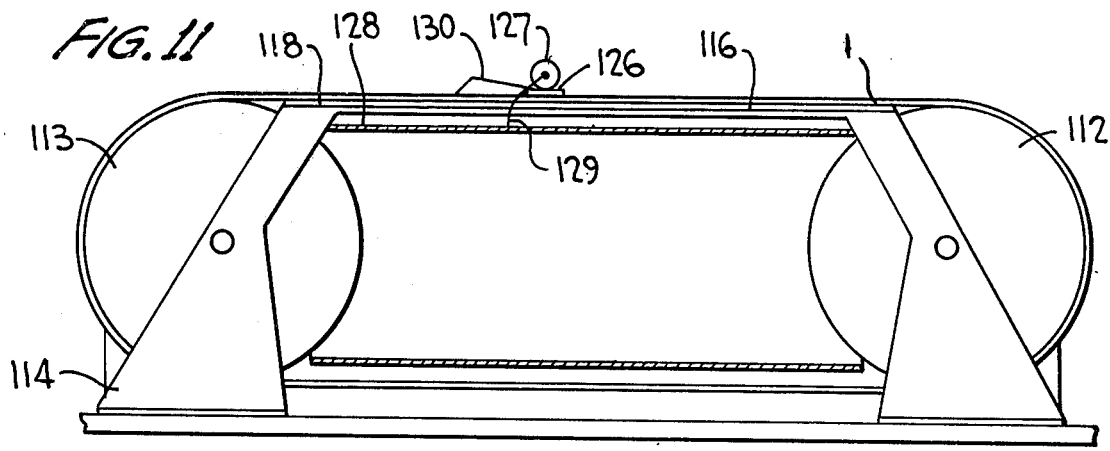

As shown in FIGS. 10 and 11, the recorder comprises endless belt 1 fitted around driver roller 112 and free roller 113 mounted in bracket 114, which is screwed to base plate 115. Bracket 114 has straight bridge section 116 between rollers 112 and 113. Two contact rails 117 and 118 are mounted to bridge 116 by means of an epoxy resin to keep rails 117 and 118 insulated from bridge 116. One end of each rail 117 and 118 ends in a terminal 119 and 120, respectively, which leads through holes 121 and 122 in bridge section 116 of bracket 114. Terminals 119 and 120 are soldering terminals for supply leads 123 and 124 from signal source 125. Signal source 125 would normally be the receiver of the sonar or echo sounder.

Clip 126 is riveted to belt 1 and signal coil 127 is bonded to clip 126. Coil 127, when energized, sets up a magnetic field which is conducted to recording medium 128 through magnetically conducting pen 129. Coil 127 is connected to two contact springs 130 and 131 which at their respective ends are attached to clip 126 and at their respective other ends are in contact with contact rails 117 and 118, respectively, through holes 132 and 133 in belt 1. The signals to be recorded are thus conducted from signal source 125 through lead 123 to contact rail 117, and from there through contact spring 131 to one end of coil 127. From the other end of coil 127 the signals are returned through contact spring 130 to contact rail 118, and from there back to signal source 125 through lead 124. Variations in the current from signal source 125 produce a varying magnetic field in coil 127, and thereby a varying magnetic field at the end of pen 129. When belt 1 is moving around rollers 112 and 113 and pen 129 traverses recording medium 128, the magnetic elements thereof are tilted to an extent depending on the current from signal source 125.

Permanent magnet 134 is also mounted on clip 126 adjacent belt 1 and extends down towards (almost touching) medium 128. Permanent magnet 134 is oriented with the north-south pole in the direction of movement of the belt. When the belt moves, magnet 134 travels across recording medium 128, and the field from magnet 134 erases any previous recording on recording medium 118. When the recorder is in use, recording medium 128 is fed forwards in the direction of the arrow and as magnet 134 travels across medium 128, it is prealigned before pan 129 makes a new recording. Magnet 134 may also trigger the echo sounder transmitter in addition to erasing old recordings.

Driver roller 112 is driven by motor 135 through gearbox 136 which in turn drives drive roller shaft 137. Motor 135 and gearbox 136 are fastened by screws to a base plate. Motor 135 is powered by power supply unit 138 through speed controller 139.

Recording medium 128 is an endless loop running around drive roller 140 and a free roller (not shown). One end of drive roller 140 is journalled in bracket 141, which is fastened to the base plate by screws. The other end of the drive roller 140 is supported by motor/gearbox unit 142 receiving power from power supply unit 148 through speed controller 143 which is journalled in a bracket equivalent to bracket 141.

Figure 12:
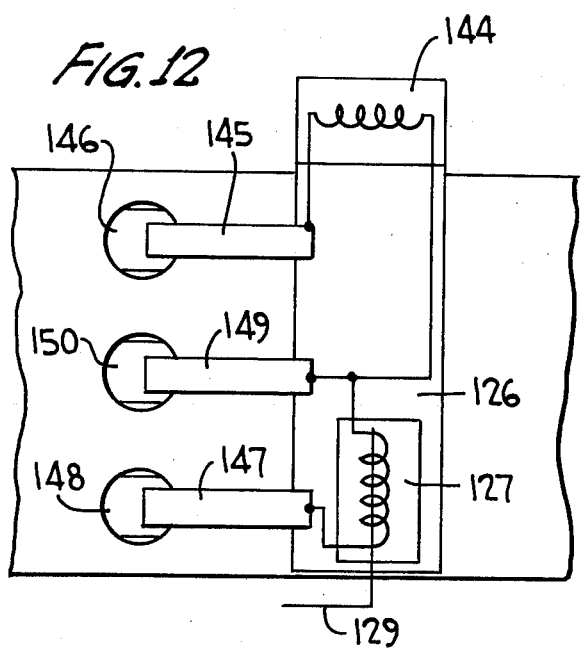
FIG. 12 is a detail view illustrating part of a recorder where the erasing structure uses an electromagnet.

FIG. 12 shows how permanent magnet 134 may be replaced by electromagnet 144. Electromagnet 144 is fed from contact rail 146 through contact spring 145. Signal coil 127 is fed from contact rail 148 and signal coil 127 has a common current return path through contact spring 149 and current rail 150. Electromagnet 144 may be powered from a DC or an AC source (not shown).

Figure 13:
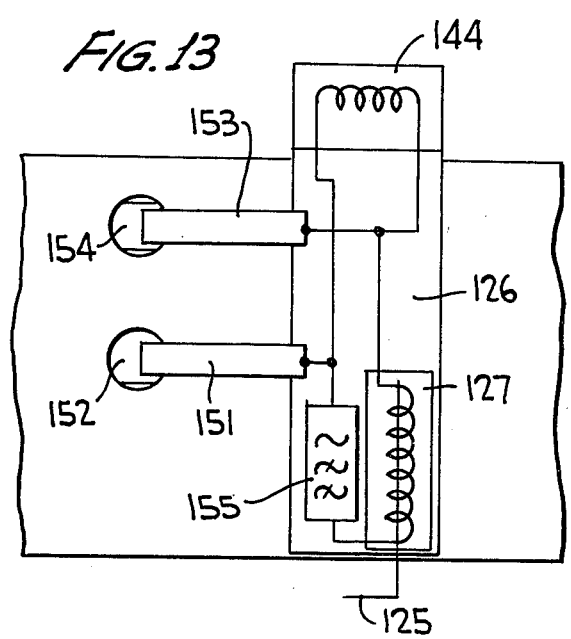
FIG. 13 is a modification of the structure shown in FIG. 12.

In FIG. 13, electromagnet 144 receives power through contact spring 151 and contact rail 152. The return is through contact spring 153 and contact rail 154. Recording signals for signal coil 127 are superimposed on the current to electromagnet 144 and are filtered out by high pass filter 155. The characteristic of filter 155 depends upon the center frequency and the bandwidth of the recording signal current in relation to the current supplied to electromagnet 144.

Figure 14:
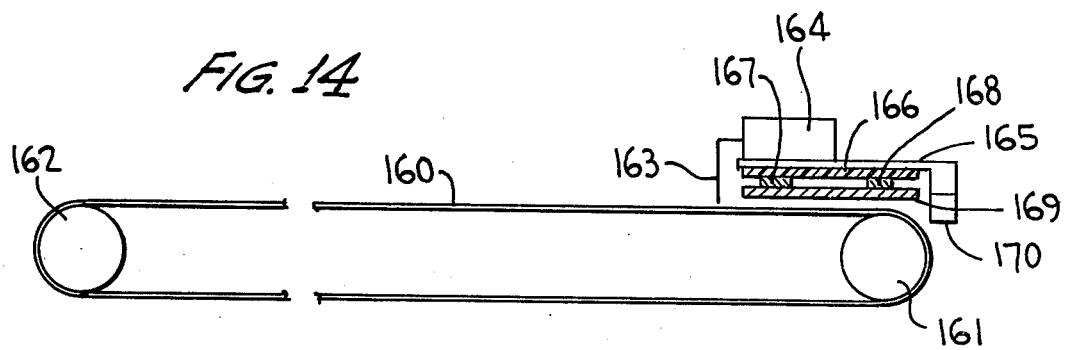
FIG. 14 illustrates the preferred path of the recording medium past the erasing magnet.

A preferred recording medium feed path is shown in FIG. 14. Recording medium 160 runs around two rollers 161 and 162. Roller 162 is driven by an electric motor (not shown). As shown in the embodiment in FIGS. 10 and 11, recording takes place by means of pen 163, which is magnetized using coil 164 which is mounted on clip 165 which is attached to an endless belt 166 which slides over two contact rails 167 and 168 on bracket 169. Eraser magnet 170 is attached to clip 165, so that the magnet travels parallel to the roller 161. Clip 165, including magnet 170, protrudes downwards bringing the center of the magnet 170 to the same level as the recording surface of the paper 160. This gives the best results because the magnetic field is parallel to the recording surface where the erasing and prealigning of the magnetic elements in the recording medium take place.

What is claimed is:

1. Apparatus for pre-aligning a recording medium responsive to a magnetic field, said recording medium being of the type containing magnetically orientable particles rendering said recording medium reflective to light with said particles oriented parallel to the surface of said recording medium, comprising:
   at least one magnet mounted on a movable support such that the component of the magnetic field parallel to the surface of said recording medium is larger than the component of the magnetic field normal to said surface and generated by said at least one magnet in a region of said surface where said magnetic field is marginally strong enough for orienting said particles; and
   means for establishing relative motion between said support and said recording medium along the dimensions of said medium and parallel to the surface of the medium, whereby the surface of said recording medium passes through the marginal magnetic field to orient said magnetically orientable particles parallel to the surface of the medium.

2. Apparatus as in claim 1 further comprising an endless belt mounted to move substantially transverse to the direction of movement of said recording medium and including means for mounting said magnet thereon.

3. Apparatus as in claim 2 further comprising means for oscillating said belt along its transverse path.

4. Apparatus as in claim 2 further comprising means for driving said endless belt continuously.

5. Apparatus as in claim 2 wherein said magnet is an electromagnet, and further comprising means for exciting said electromagnet, means for conducting current to said electromagnet including spaced conductors mounted parallel to said endless belt, said means for mounting said electromagnet includes spring contacts and said endless belt includes apertures enabling said spring contacts to contact said spaced conductors.

6. Apparatus as in claim 1 further comprising means for mounting said magnet in spaced proximity to said recording medium and means for rotating said magnet in a plane parallel to said recording medium.

7. Apparatus as in claim 6 wherein said at least one magnet includes an electromagnet mounted at each end of said means for mounting said at least one magnet and further comprising a bevel gear and motor for rotating said electromagnets in a plane parallel to said recording medium, means for exciting said electromagnets and a slip-ring assembly and conductor elements engaging said slip-ring assembly for transmitting current to said electromagnets.

8. Apparatus as in claim 1 wherein said at least one magnet comprises a number of permanent magnets mounted in two rows in spaced relation to form an aperture therebetween for transport of said recording medium.

9. Apparatus as in claim 8 further comprising means for oscillating said permanent magnets in a direction substantially transverse to the direction of movement of said recording medium.

10. Apparatus as in claim 1 further comprising means for magnetically recording signals on said magnetic recording medium and means for transporting said recording medium along a given path, means for regulating the speed of movement of said recording medium;
    means for rotatably mounting an endless belt for movement in a direction substantially transverse to the movement of said recording medium;
    at least one electromagnet mounted on said endless belt;
    means for energizing said at least one electromagnet including a spaced pair of conductors mounted in parallel relationship to said endless belt, contact elements mounted on said electromagnet for contact with said spaced pair of conductors; and
    said endless belt includes apertures therein for enabling said contact elements to contact said pair of conductors.

11. A method for erasing magnetic recordings on a recording medium of the type containing magnetically orientable particles rendering said recording medium reflective to light with said particles oriented parallel to the surface of the recording medium, comprising the steps of:
    subjecting said recording medium to a movable magnetic diverging field generated by said at least one magnetic pole in close proximity to said recording medium; and establishing a magnetic field in the plane of said medium greater than the magnetic field component perpendicular to said plane; and orienting said particles in those regions of said medium where said magnetic field is marginally strong enough.

12. A method as in claim 11 further comprising the step of moving said at least one magnet transverse to the direction of transport of said recording medium.

* * * * *